United States Patent Office
3,806,420
Patented Apr. 23, 1974

3,806,420
PROCESS FOR THE PREPARATION OF CREATININE AMIDOHYDROLASE
Gunter Holz, Johanna Gramsall, Michael Nelboeck-Hochstetter, and Hans Ulrich Bergmeyer, Tutzing, Upper Bavaria, Germany, assignors to Boehringer Mannheim GmbH, Mannheim-Waldhof, Germany
No Drawing. Filed May 2, 1972, Ser. No. 249,588
Claims priority, application Germany, May 5, 1971, P 21 22 294.6
Int. Cl. C12d 13/10
U.S. Cl. 195—66 R                   18 Claims

ABSTRACT OF THE DISCLOSURE

Creatinine amidohydrolase and creatine amidinohydrolase are prepared by a process comprising culturing (a) Alcaligenes spec. WS 51400 or (b) Penicillium WS 90001; in a creatinine-containing medium, digesting same, obtaining the creatinine amidohydrolase in substantially pure form from the water-soluble digestion fraction and, optionally separating by ion exchange chromatography any creatine amidinohydrolase present.

---

The invention is concerned with two new enzymes, creatinine amidohydrolase and creatine amidinohydrolase, and with a novel process for the preparation thereof from microorganisms.

In clinical chemistry, especially for the functional diagnosis of the kidney, the determination of the intermediate and end products of protein metabolism play an important part. The products of this metabolism include creatinine and creatine. Methods for the determination of creatinine have already been frequently described. Most of the known methods are based on the nonenzymatic Jaffe reaction which, however, suffers from the disadvantage of being non-specific.

Furthermore, there has also been described a specific microbiological method of determination of creatinine with the use of isolated bacteria in which washed cell suspensions were used for the measurement of the creatinine and the formation of urea and ammonia was used as a measure of the enzyme action. However, it was not possible to obtain soluble enzyme extracts capable of breaking down creatinine. A prerequisite for the provision of a specific creatinine determination with the help of enzymes is, however, the discovery of appropriate soluble enzymes which can catalyze specific and measurable reactions of creatinine. With this object in view, experiments have been carried out with, for example, Corynebacterium, Pseudomonas aeroginosa, Pseudomonas ovalis, Pseudomonas eisenbergii and Clostridia, but all of these experiments were unsuccessful.

Roche, Lacombe and Girard (BBA 6, 210/1950) characterized, in two types of Psuedomonas, creatinase, creatininase and a glycocyaminase as specific enzymes which liberate urea from their substrates from the guanidino group. Furthermore, Akamatsu et al. (Enzymologia, 15, 122, 158 173/1951) found, in soil bacteria, an enzyme which they called creatine-mutase and which brings about the equilibrium adjustment between creatinine and creatine. The following course of breakdown of the creatinine was assumed:

Creatinine⇌creatine→urea and sarcosine→glycine→NH$_3$

We have now found and isolated, in a state of high purity, two enzymes in microorganisms, which enzymes appear to decisively participate in the breakdown of creatinine, viz., a creatinine amidohydrolase and creatine amidinohydrolase. The present invention is based on the discovery that two microorganisms are particularly efficacious for providing the enzymes creatinine amidohydrolase and creatine amidinohydrolase.

Thus, this invention comprises a process for preparing said enzymes. The process comprises, essentially, culturing a microorganism when the microorganism is (a) Alcaligenes spec. WS 51400 or (b) Penicillium WS 90001; in a creatinine-containing medium, digesting same and obtaining the creatinine amidohydrolase in pure form from the water-soluble digestion fraction by known biochemical purification and fractionation methods carried out at a pH value above 7.0, with the use of a test in which creatine formed from added creatinine is determined in known manner. Thereafter, if desired, any creatine amidinohydrolase present is separated by exchange chromatography from the creatinine amidohydrolase obtained.

The following reactions are catalyzed by two enzymes provided by the present invention:

(a) 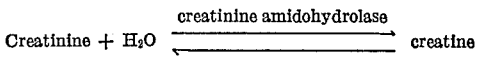
Creatinine + H$_2$O ⇌ creatine (b) 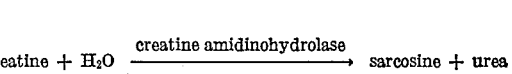
Creatine + H$_2$O → sarcosine + urea Since Equation (a) is that of an equilibrium reaction with the taking up or removal of water, the enzyme which participates in this reaction is called creatinine amidohydrolase.

As starting material for obtaining the two new enzymes, there can, in general, be used said microorganisms in which the desired enzymes are adaptively enriched, this usually taking place by culturing the microoganisms in the presence of or with the addition of creatinine.

A water-soluble fraction is obtained by digestion of the microorganism so obtained. The usual digestion methods can be used, depending upon the strength or resistance of the cell membrane of the microorganism used. High pressure dispersion and ultrasonic digestion have proved to be especially useful. Further examples of digestion methods include the use of distintegration mills, for example those of Balutini and Schlossmann, and digestion methods working on a similar basis. Chemical or enzymatic digestion methods can also be used.

The creatinine amidohydrolase can be enriched from the so obtained water-soluble fraction by known biochemical purification methods by utilizing its ability to convert creatinine into creatine for testing the result of any biochemical purification method used. The creatine formed can be determined by known methods, for example, by the addition of adenosine triphosphate and measurement in the usual way of the adenosine diphosphate formed. It is, however, necessary to operate at pH values above 7 and to select a purification method which can be used at these pH values.

According to a further method of following the progress of the enrichment process, the creatine formed is split with creatine amidinohydrolase, with the formation of sarcosine and urea, and then to determine the urea in the usual way, for example, by the use of urease.

The extent to which the purification is carried out depends upon the intended use of the enzyme or enzymes. If it is desired to obtain a preparation suitable for the enzymatic determination of creatinine, a single purification step suffices. Examples of such purification steps include a polyanion treatment, fractionation with organic solvents or chromatography. With the use of the above-mentioned methods of determination, it is possible, in a simple manner to ascertain the content of the desired enzyme and to enrich it to a considerable extent in a single step.

Since a comparatively long storage of the collected and frozen microorganisms could lead to a decrease of activity of the desired enzymes, the cells are preferably further worked up as quickly as possible after collection. Two microorganisms used for carrying out the process of the present invention are Alcaligenes spec. WS 51400 of the *Achromo bactericeae* and Penicillium WS 90001. These two microorganisms are deposited, under the stated numbers, in the collection of the Bacteriological Institute of the Technical University, Munich, Germany, at Weihenstephan.

Alcaligenes spec. WS 51400 possesses the following properties: strictly oxidative gram-negative, short rodlets with peritrichous flagellation. The microorganism is weakly oxidase-positive, alkalizes litmus milk and is capable of denitrification. Furthermore, the following properties have been ascertained:

| | |
|---|---|
| Growth at 4° C. | − |
| Growth at 41° C. | − |
| Gelatine liquifaction | − |
| Tributyrin fission | − |
| Egg yolk reaction | − |
| Pigment formation | − |
| Fermentation of: | |
|    Arabinose | + |
|    Glucose | + |
|    Maltose | (+) |
|    Cellobiose | (+) |
|    Trehalose | + |
|    2-ketogluconate | + |
|    Mannitol | (+) |
|    m-inositol | − |
|    Glycollate | − |
|    Pelargonate | − |
|    Adipate | + |
|    p-Hydroxybenzoate | + |
|    Phenylacetate | − |
|    Valine | − |
|    Arginine | (+) |
|    δ-Aminovalerate | − |
|    Tryptophane | − |
|    Betain | + |
|    Hippurate | − |
|    Acetamide | − |
|    Benzylamine | − |

According to present knowledge, this microorganism belongs to the Achromobacteraceae family and is to be assigned, with great probability, to the genus Alcaligenes.

The other preferred microorganism, namely WS 90001, is a fungus of the Penicillium genus.

In order adaptatively to enrich the desired enzymes in the microorganisms to be used according to the present invention, these are preferably cultured with the addition of creatinine to the nutrient medium. The microorganisms are advantageously allowed to grow on a nutrient substrate which contains glucose or glycerol, as a source of carbon and creatinine, as well as salts and vitamins in the amounts and compositions known in microbiology. An especially preferred nutrient medium has the following composition:

0.5 wt. percent glucose or glycerol
0.5 wt. percent creatinine
0.08 wt. percent ammonium sulphate
0.02 wt. percent magnesium sulphate hydrate
0.05 wt. percent yeast extract
1 mg. nicontinic acid
1 mg. thiamine-p-aminobenzoic acid
1 mg. vitamin $B_6$
0.1 mg. biotin together with traces of iron sulphate, calcium chloride and manganese sulphate, dissolved in M/10 potassium phosphate buffer with a pH of 6 in the case of the Penicillium or with a pH of 7 in the case of Alcaligenes.

A strain of the mircoorganisms to be used according to the present invention is obtained in the usual way on agar tilted tubes by the addition of 2% agar to a suitable nutrient substrate, preferably to the above-described nutrient substrate, to which 5 ml./liter of a 0.05% bromothymol blue solution is also added. Under optimum growth conditions, the indicator changes color, in the case of the Penicillium after 4 to 6 days and in the case of the Alcaligenes in 2 to 3 days. The color change is clearly into the alkaline region, brought about by the breakdown of creatinine and creatine. Creatinine-utilizing microorganisms which do not bring about the breakdown according to the above-mentioned metabolic scheme with the above-mentioned enzymes, do not bring about this alkalization.

The microorganisms to be used according to the present invention permit the economic production of creatinine amidohydrolase and creatine amidinohydrolase from the water-soluble protein fractions obtained from a digest of the microorganisms.

Since creatinine amidohydrolase and also creatine amidinohydrolase quickly lose their activity at pH values of 6 and below and exhibit the greatest stability at pH values of about 8.0, the digestion is preferably carried out with the use of an alkaline buffer, 0.1 M potassium phosphate buffer (pH 8.0) being preferably used. The buffer and the buffer concentration used should preferably be such that any further enrichment of the enzymes can also be carried out in the buffer used for the digestion. When carrying out the digestion by high pressure dispersion, usually at about 700 to 800 ats., further purification can, when using a polyanion treatment, be carried out without previous separation of the cell residues. Examples of polyanions which can be used include protamine sulphate and water-soluble polyethyleneimines. It is preferred to add a water-soluble polyethyleneimine, for example, in the form of a 10% solution of pH 8. When using a solution of this concentration, an about 5% addition thereof, referred to the digest volume, is necessary to achieve complete precipitation. The precipitate can then be separated by physical means, for example, by filtering or centrifuging, the desired enzymes remaining in the supernatant.

Instead of a polyanion precipitation, a precipitation with organic solvents can also be advantageous, isopropanol preferably being used. In this case, the cell residues are first removed after the digestion and then the organic solvent is added at ambient temperature. The isopropanol fractionation is preferably so carried out that at about 25° C., 800 ml. of 90% isopropanol is added per litre of digest solution and the precipitate separated off. The supernatant obtained is again mixed with 500 ml. isopropanol per litre and the precipitate, which contains the two desired enzymes, separated off.

A combined use of the two above-mentioned methods, namely polyanion precipitation and subsequent fractionation with organic solvents, is especially preferred.

Not only the products obtained with a single enrichment step but also those with the two combined steps are sufficiently pure for use in a specific creatinine determination. The enzymes creatinine amidohydrolase and creatine amidinohydrolase are hereby always obtained in a mixture. If it is desired to separate the enzymes, the preparation so obtained is subsequently separated by exchange chromatography, a weakly basic ion exchanger, such as diethylaminoethyl-Sephadex or diethylaminoethyl-cellulose having proved to be especially useful.

The enzymes are adsorbed on the exchanger, for example on diethylaminoethyl-"Sephadex," at a low ion concentration, preferably below 0.1 M and more preferably of about 0.01 to 0.05 M. Subsequently, the exchanger is washed with an ion concentration of about 0.1 M, non-active accompanying proteins thereby being removed. Creatinine amidohydrolase can then be eluted with 0.2 M buffer solution, whereas the creatine amidinohydrolase still remains on the exchanger. It can also be eluted by increasing the ion concentration to 0.5 M, for example, by using 0.2 M potassium phosphate buffer (pH 8.0) with a content of 0.3 M sodium chloride or potassium chloride or a similar salt.

The above-described preferred embodiment of the process according to the present invention, which combines an isopropanol fractionation with an exchange chromatography, leads to an approximately 100 to 150 fold enrichment of the enzymes and gives a creatinine amidohydrolase preparation with a specific activity of more than 200 u./mg. The creatine amidinohydrolase is hereby enriched about 100 fold, a preparation with an activity of 3 u./mg. being obtained.

According to another embodiment of the process according to the present invention, a very simple high purification of the desired enzymes can be obtained without separation when, in a batch process, sufficient exchanger is added to adsorb both enzymes. The exchanger is then separated and thereafter washed and subsequently eluted in the manner described above.

A further possibility for the purification and enrichment of the two enzymes is by means of salt precipitation or salt fractionation, for example, with the use of ammonium sulphate. Thus, when using ammonium sulphate, creatinine amidohydrolase precipitates at a concentration of 2.2 M and creatine amidinohydrolase or the mixture of the two enzymes at a concentration of 2.7 M.

Salt precipitation can also be used for obtaining the enzymes from solutions thereof, such as are obtained, for example, by elution of the exchanger. By dialysis at about 4° C., expediently against diluted buffer, for example 0.02 M diethanolamine buffer (pH 8.0), the enzymes can be freed from salts and other low molecular weight accompanying materials.

The preparations so obtained can be stored for several months in a frozen state, without loss of activity.

If only creatinine amidohydrolase is desired, a further purification and enrichment step can also comprise a heating step at 60° C. Such heating for a period of 5 minutes does not lead to any noticeable reduction of the creatinine amidohydrolase activity. However, in contradistinction thereto, the creatine amidinohydrolase loses its activity under these conditions.

The new enzymes according to the present invention can be used for sicientific purposes, as well as for the specific determination of creatinine and creatine.

The following examples are given for the purpose of illustrating the present invention.

EXAMPLE 1

Enrichment of active fungal mycelia in a submersed shake culture 2 litres of a nutrient substrate containing, by weight, 1% glucose, 0.5% creatinine, 0.08% ammonium sulphate, 0.02% magnesium sulphate heptahydrate, 0.05% yeast extract, 1 mg. each of nicotinic acid, thiamine-p-aminobenzoic acid and vitamin $B_6$, 0.1 mg. biotin and traces of iron sulphate, calcium chloride and manganese sulphate, in 0.10 M potassium phosphate buffer (pH 6) are inoculated in a shaking flank with 200 ml. of a 48 hours old pre-culture of Penicillium WS 90001 and cultured in a shaking apparatus for 4 days. The creatinine content drops in this time from 0.5% weight to scarcely 0.1% by weight and, after this time, the glucose is almost used up. Furthermore, the pH value increases to 7.5 to 8.0. There are thus obtained 3 to 4 g. Penicillium WS 90001 dry weight per litre of culture solution with a content of 45 to 60 IU/g. dry weight of creatinine amidohydrolase.

EXAMPLE 2

In a culture flask containing 15 litres of the nutrient medium described in Example 1 are cultured, with vigorous aeration, 1.5 litres of a well grown pre-culture of Alcaligénes spec. WS 51400. During the whole culturing period, the pH is maintained constant at 7.0. The creatinine and the glucose content are followed continuously. The creatine utilization take place mainly in the second third of the log phase, whereas the glucose is broken down first. The culture is maintained at 30° C. After 35 hours, 1.5 g. dry bacteria mass can be collected per litre of culture solution. The specific activity of creatinine amidohydrolase is 1600 IU/g. dry weight.

EXAMPLE 3

Alcaligenes spec. WS 51400. During the whole culturing Example 2, in a working volume of 60 litres. As soon as the desired stage of growth is reached, fresh nutrient substrate is added to the culture vessel and grown culture solution is removed from the culture vessel at the same rate. The dilution rate (flow velocity/working volume) is thereby 0.13 to 0.18 and preferably about 0.16. 500 litres of air are passed through the culture solution per hour. There is thus obtained, by continuous culturing, a yield of 3 to 5 g. dry bacteria mass per litre, with a specific activity such as is obtained by the batch proceess described in Example 2.

Alcaligenes spec. WS 51400 is thus well suited for continuous culturing in the manner described above.

EXAMPLE 4

Isolation of highly purified creatinine amidohydrolase

The cells (1 kg. dry weight) are separated from a culture batch of Alcaligenes spec. WS 51400 cultured in the presence of creatinine, then made up with 0.1 M potassium phosphate buffer (pH 8.0) to 20 litres and, without cooling, digested by high pressure dispersion at a pressure of about 800 ats. The extract is mixed with 5 vol. percent of a 10% polyethyleneimine solution (mol. weight about 1800) of pH 8.0 (about 1 litre). After the addition of potassium chloride (0.01 M end molarity) and ammonium chloride (0.1 M end molarity), there are added, within the course of 10 minutes, 0.8 volume of 90% aqueous isopropanol per litre of extract, followed by stirring for 30 minutes at ambient temperature.

The copious precipitate obtained is centrifuged off, whereafter 0.45 volume of 90% isopropanol are added per litre of supernatant.

The precipitate so formed, which contains creatinine amidohydrolase and creatine amidinohydrolase, in separated off and taken up in 400 ml. 0.02 M potassium phosphate buffer (pH 8.0). Undissolved residue is separated off and the supernatant is applied to a diethylaminoethyl-"Sephadex" column (3.5 cm. x 1 m.) which has been equilibrated with the same buffer. Thereafter, the column is washed with 1 vol. 0.1 M potassium phosphate buffer (pH 8.0) and then eluted with 0.2 M potassium phosphate buffer (pH 8.0). The creatinine amidohydrolase-containing fractions are combined and adjusted at pH 8.0 with ammonium sulphate to 2.2 M. The precipitated enzyme is centrifuged off and dissolved in 0.02 M diethanolamine buffer (pH 8.0) to give a volume of 100 ml. and then dialyzed for 4 hours at 4° C. against the same buffer. There is thus obtained a total yield of 64% of a preparation with a specific activity of 303 u./mg. The following Table I summarizes the activities and yields obtained in the individual steps of this process.

TABLE I

|  | U. (25° C.) | Protein in g. | U./mg. | Yield, percent |
| --- | --- | --- | --- | --- |
| Dispersion digestion | $2.8 \times 10^5$ | 98.6 | 2.8 | 100 |
| Polyethyleneimine supernatant | $2.6 \times 10^5$ | 66.2 | 3.9 | 93 |
| First isopropanol addition (supernatant) | $2.16 \times 10^5$ | 32.6 | 6.6 | 77 |
| Second isopropanol addition (precipitate) | $1.97 \times 10^5$ | 6.9 | 28.5 | 71 |
| Diethylaminoethyl-"Sephadex" chromatography (eluates) | $1.8 \times 10^5$ | 0.59 | 303 | 64 |

When carrying out the digestion ultrasonically, instead of by high pressure dispersion, the content of creatinine amidohydrolase, with about the same specific activity, can be increased 2.5 fold, referred to the dry weight of the microorganisms used.

The creatinine amidohydrolase obtained as described above has an equilibrium constant $$\left[\frac{\text{Creatine}}{\text{Creatinine}}\right]:K=1.27$$

(37° C.; pH 8.0).

The Michealis constant for creatinine as substrate $$K_M=3.3\times10^{-2}$$

M (37° C.; pH 8.0).

$$K_M=3.3\times10^{-2}\text{M}$$

(37° C.; pH 8.0).

EXAMPLE 5

Separation of creatinine amidohydrolase and creatine amidinohydrolase

The procedure described in Example 4 is repeated. However, after elution of the creatinine amidohydrolase from the exchanger column, the creatine amidinohydrolase is eluted with 0.2 M potassium phosphate buffer (pH 8.0), containing 0.3 M sodium chloride. The following Table II shows the details.

TABLE II

[Separation of creatinine amidohydrolase and creatine amidinohydrolase on diethylaminoethyl-"Sephadex" anion exchanger]

| Step | Protein in mg. | Creatinine amidohydrolase U. | U./mg. | Creatine amidinohydrolase U. | U./mg |
|---|---|---|---|---|---|
| After isopropanol step | 175 | 860 | 4.9 | 44 | 0.25 |
| Diethylaminoethyl-"Sephadex" wash water | 90 | 1 | | 0 | |
| 0.20 M pH 8.0 (eluate) | 29 | 787 | 27 | 0 | |
| 0.50 M pH 8.0 (eluate) | 13.7 | 1.8 | 0.13 | 41 | 3.0 |

EXAMPLE 6

The procedure described in Example 4 is repeated. However, the diethylaminoethyl-"Sephadex" chromatography is replaced by a diethylaminoethyl - "Sephadex" batch process.

Starting from 100 g. Alcaligenes spec. WS 51400, 100 ml. of the second isopropanol precipitate are dissolved in 0.02 M potassium phosphate buffer (pH 8.0) and mixed with such an amount of diethylaminoethyl-"Sephadex" that in the supernatant there remain about 5% of each of the enzymes (about 20 g. of moist, pressed out exchanger). The exchanger is filtered off, washed with about 100 ml. 0.08 M potassium phosphate buffer (pH 8.0) and, for the joint elution of the two enzymes, stirred with 100 ml. 0.2 M potassium phosphate buffer (pH 8.0), containing 0.3 M potassium chloride, for 15 minutes at 4° C. and subsequently filtered. Both enzymes are present in the eluate. The following Table III shows that, by precipitation with ammonium sulphate, there can be obtained a preparation containing 31.5 u./mg. creatinine amidohydrolase and 1.1 u./mg. creatine amidinohydrolase.

TABLE III

[Isolation of an enriched enzyme mixture of creatinine amidohydrolase and creatine amidinohydrolase from 100 g. (dry weight) Alcaligenes spec. WS 51400]

| Step | Protein in g. | Creatinine amidohydrolase U. | U./mg. | Creatine amidinohydrolase U. | U./mg |
|---|---|---|---|---|---|
| Digest | 26.1 | 2.4×10⁴ | 0.92 | 6×10² | 0.023 |
| Second isopropanol addition (precipitate) | 1.43 | 1.98×10⁴ | 13.9 | 3.8×10² | 0.265 |
| Diethylaminoethyl-"Sephadex" eluate 0.5 M pH 8.0 | 0.370 | 1.16×10⁴ | 31.5 | 4.1×10² | 1.1 |

EXAMPLE 7

7 g. (dry weight) Alcaligenes spec. WS 51400, grown in the presence of creatinine, were collected and digested ultrasonically at pH 8.0. The suspension obtained was mixed, as described in Example 1, with 0.8 volume isopropanol, stirred for 30 minutes at ambient temperature and centrifuged. The supernatant is mixed with a further 0.45 volumes isopropanol and again centrifuged. The precipitate is taken up as described in Example 1 and chromatographed over a diethylaminoethyl-"Sephadex" column, only the creatinine amidohydrolase thereby being eluted. The following Table IV shows the details of this process. The preparation obtained was only suitable for the determination of creatinine.

TABLE IV

| Step | U. (25° C.) | Protein in g. | U./mg. | Yield, percent |
|---|---|---|---|---|
| Ultrasonic digest | 1.5×10³ | 1.780 | 0.85 | 100 |
| Second isopropanol addition (precipitate) | 1.2×10³ | 0.119 | 10.1 | 80 |
| Diethylaminoethyl-"Sephadex" eluate | 0.7×10³ | 0.028 | 25 | 47 |

In the experiments described in the above examples, the creatine formed from creatinine in the presence of creatinine amidohydrolase was determined by the addition of adenosine triphosphate (ATP); in the presence of creatine phosphokinase (CPK), the creatine is converted into creatine phosphate and adenosine diphosphate (ADP). ADP formed is converted into ATP with pyruvate kinase (PK) and lactate dehydrogenase (LDH), as well as phosphoenol pyruvate (PEP), with the consumption of NADH as measured optically. These known steps can be illustrated as follows:

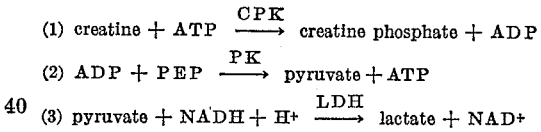

(1) creatine + ATP $\xrightarrow{\text{CPK}}$ creatine phosphate + ADP (2) ADP + PEP $\xrightarrow{\text{PK}}$ pyruvate + ATP (3) pyruvate + NADH + H⁺ $\xrightarrow{\text{LDH}}$ lactate + NAD⁺

The creatine amidinohydrolase determination was carried out by measurement of the urea formed from creatinine, the urea thereby being measured by the urease process.

The Michealis constant for creatine was determined as follows: $K_M=5\times10^{-2}M$ (25° C.; pH 7.6).

It will be understood that the specification and examples are illustrative but not limitative of the present invention and that other embodiments within the spirit and scope of the invention will suggest themselves to those skilled in the art.

What is claimed is:

1. Process for preparing creatinine amidohydrolase comprising culturing (a) Alcaligenes spec. WS 51400 or (b) Penicillium WS 900001; in a creatinine-containing medium, digesting said microorganisms and recovering creatinine amidohydrolase from the water-soluble digestion fraction in substantially purified form by known biochemical purification methods carried out at a pH of about 7.0.

2. Process as claimed in claim 1 wherein said creatinine amidohydrolase obtained in substantially purified form is subjected to exchange chromatography to separate therefrom any creatine amidinohydrolase.

3. Process as claimed in claim 1 wherein said digesting is carried out mechanically.

4. Process as claimed in claim 3 wherein the mechanical digesting is carried out by means of high pressure dispersion or by use of a digestion mill or ultrasonically.

5. Process as claimed in claim 4 wherein said digesting is effected by high pressure dispersion carried out at a pressure of from 700 to 800 atmospheres.

6. Process as claimed in claim 1 wherein said digesting is carried out at a pH value of about 8.0.

7. Process as claimed in claim 1 wherein said water-soluble digestion fraction is purified by a polyanion fractionation.

8. Process as claimed in claim 7 wherein the polyanion fractionation is carried out by a polyethyleneimine precipitation at a buffer concentration of about 0.1 M.

9. Process as claimed in claim 1 wherein a purification is carried out by means of an isopropanol fractionation in one or more steps.

10. Process as claimed in claim 9 wherein the isopropanol fractionation is carried out with 90% isopropanol at about 25° C.

11. Process as claimed in claim 2 wherein the enzymes are adsorbed on a weakly basic ion exchanger at an ion concentration below 0.1 M, the exchanger is washed with about 0.1 M buffer and creatinine amidohydrolase and creatine amidinohydrolase are eluated with an ion concentration of 0.2 M and 0.5 M, respectively.

12. Process as claimed in claim 11 wherein the enzymes are adsorbed on the weakly basic ion exchanger at an ion concentration of 0.01 to 0.05 M.

13. Process as claimed in claim 1 wherein the enzymes are isolated from solutions thereof by a salt precipitation or salt fractionation, creatinine amidohydrolase precipitating at a concentration of 2.2 M and creatine amidinohydrolase or a mixture of the two enzymes precipitating at a concentration of 2.7 M.

14. Process as claimed in claim 13 wherein the solutions used for the salt precipitation or salt fractionation are first purified by dialysis.

15. Process as claimed in claim 14 wherein the dialysis carried out at about 40° C. against a diluted buffer.

16. Process as claimed in claim 15 wherein the diluted buffer is 0.02 M diethalolamine buffer with a pH of 8.0.

17. Process as claimed in claim 1 wherein said creatinine-containing medium also contains glucoses or glycerine.

18. Process as claimed in claim 17 additionally containing salts and vitamins.

References Cited

Kopper: Archives of Biochemistry, vol. 19, pp. 171–172 (1949).

Roche et al.: Biochimica et Biophysica Acta, vol. 6, pp. 210–216 (1950).

LIONEL M. SHAPIRO, Primary Examiner